Dec. 17, 1968     H. W. GRIFFIN     3,416,833
WINDSHIELD MOUNTING
Filed June 27, 1967

INVENTOR.
Henry W. Griffin
BY
Herbert Furman
ATTORNEY

United States Patent Office 3,416,833
Patented Dec. 17, 1968

3,416,833
WINDSHIELD MOUNTING
Henry W. Griffin, Birmingham, Mich., assignor to General Motors Corporation, Detroit, Mich., a corporation of Delaware
Filed June 27, 1967, Ser. No. 649,224
4 Claims. (Cl. 296—93)

ABSTRACT OF THE DISCLOSURE

A vehicle body has a windshield opening which is defined by a continuous first body wall extending generally normal to the plane of the opening. A second continuous body wall extends generally parallel to the plane of the opening and normal to the first wall. The body walls are formed of conventional body stampings. An elongated generally flat continuous member or strip is adhesively secured to the second body wall entirely around the opening. A second elongated continuous member or strip, narrower and harder than the first strip, is provided with a tapered free side or edge and an opposite base side or edge which is adhesively secured to the inside surface of the windshield adjacent the edge thereof. Both strips are preferably formed of butyl rubber which is deformable but self-sustaining as to form and will adhere to painted metal, glass, and to each other. The windshield is then moved toward the second body wall to force or press the free edge of the second strip into the first strip and adhesively secure the strips to each other to mount the windshield on the body. The second strip is harder than the first strip to ensure penetration of the first strip and remains substantially undeformed as it is pressed within the first strip. Rubber blocks are provided along the lower edge of the windshield opening on the first wall either before or after the windshield is mounted within the body opening in order to support the weight of the windshield if the strips cannot support this weight.

---

This invention relates generally to vehicle bodies and more particularly to the mounting of transparent windows or panels, such as windshields or backlites, on vehicle bodies.

United States Patents 3,155,204, Campbell et al., 3,155,-422, Campbell et al., and 3,241,277, Coppock, disclose a current production mounting of fixed vehicle windows on vehicle bodies by the use of a bead of curable adhesive material which is applied to the window, deformed by engagement with a continuous body wall when the window is located within the opening to form a layer securing the window to the body wall, and thereafter cured. This mounting has proven exceptionally well under all operating conditions and offers several distinct and outstanding advantages over other earlier methods of mounting windows on vehicle bodies by extruded weatherstrips.

The subject windshield mounting is an improvement over that disclosed in the aforenoted patents.

In the preferred embodiment of this invention, a generally flat, thin, continuous member or strip of self-sustaining form has one side thereof adhesively secured to the conventional body wall which extends generally parallel to the plane of the window opening. A second continuous member or strip of self-sustaining form and harder than the first strip has the base side thereof adhesively secured to the inner surface of the window adjacent to the edge thereof. Preferably the free side or edge portion thereof is of generally triangular shape. Thereafter the window is located within the window opening which is defined by a conventional continuous body wall which extends generally normal to the first body wall to which the first strip is secured. The window is moved within the opening toward the first wall to force or press the free edge portion of the second strip within the first strip and adhesively secure the strips to each other to mount the window on the body. Suitable rubber blocks may be provided along the lower edge of the window opening, either before the window is mounted in place or thereafter, to support the weight of the window if the strips cannot support such weight.

Both strips are formed of the same material, which is preferably a butyl rubber deformable but self-sustaining as to form and which will adhere to painted metal, glass, and to itself.

Preferably, both strips are supplied in rolls, with a layer of paper tape applied to one side thereof. This aids in unrolling the strips and also furnishes a nonsticking surface against which a tool such as a roller can be applied when the strips are mounted on their respective supports. The necessary length of the strip is cut off from the roll, positioned in place on its support, and then pressed against the support so as to adhere to the support. The paper tape is, of course, removed before the window is mounted on the body by forcing the harder and narrower strip to penetrate the softer and wider strip and to adhere thereto.

The windshield mounting of this invention offers several advantages over the aforenoted mounting which uses a bead of curable adhesive material. To apply the bead of curable material to the window require equipment to pump the material from the containers to nozzles as well as to provide for purging of the system and mixing of the material before it is used. Additionally, a dam, such as shown in the Coppock patent, is required to prevent spreading of the adhesive material into sight areas of the window and body when the bead is deformed.

The strips used in the mounting of this invention are self-sustaining as to form so that only minor manual tools, such as a roller, are required to apply the strips to their respective supports. Additionally no dam is required to control any flow of the material into sight areas.

The primary object of this invention is to provide an improved mounting of transparent closures on vehicle bodies.

This and other objects of this invention will be readily apparent from the following specification and drawings wherein.

Figure 1:
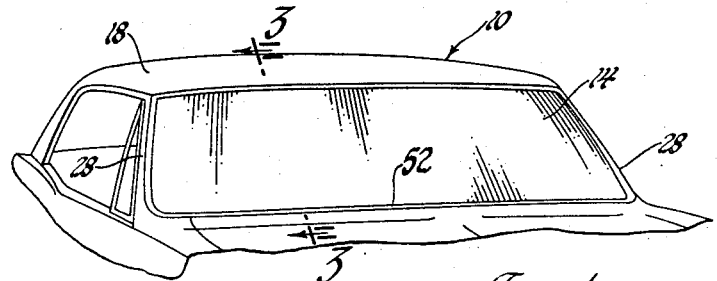
FIGURE 1 is a partial perspective view of a vehicle body having a windshield mounted thereon according to this invention.
Figure 2:
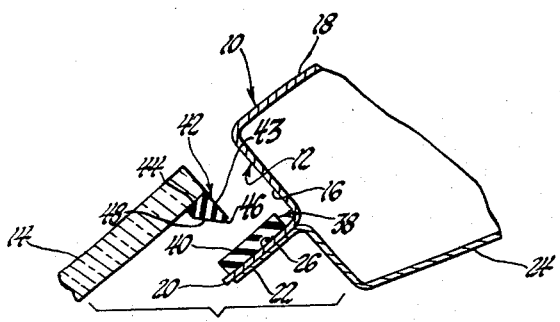
FIGURE 2 is an enlarged sectional view showing the strips on the windshield and on the body prior to one being pressed within the other.

Referring now to the drawings, a vehicle body 10 includes a conventional continuous body wall 12 defining a windshield opening which is adapted to be closed by a windshield 14. A lateral flange 16 of the roof panel 18 provides the wall 12 along the upper edge portion of the windshield opening and merges into a laterally extending flange 20 which is joined to a similar flange 22 of the body header 24 to form a pinchweld flange and provide a continuous body wall 26 along the upper edge portion of the windshield opening. Wall 26 extends generally parallel to the plane of the windshield opening defined by wall 12. The body walls 12 and 26 along the side edge portions of the windshield opening are defined by flanges of the body pillars 28 in a conventional manner. Along the lower edge portion of the windshield opening, wall 12 is defined by the body cowl panel 30. A flange 32 of the cowl panel is welded to a flange 34 of a dash panel 36 to provide the wall 26 along the lower edge portion of the windshield opening. Body structure such as hereinbefore described is common in present and past vehicle bodies and although various details of the body parts have not been shown and described, they are known to persons skilled in this art. It will be understood that in certain body structures, the body walls 12 and 26 may be formed in other ways and, accordingly, this invention is not limited to a wall formed in the particular manner described herein. Generally, this invention may be successfully practiced in mounting a windshield or backlite or other fixed windows on a vehicle body as long as the body includes a first wall extending laterally to the plane of the opening and a second wall extending parallel to the plane of the opening.

In present practice, the bodies are completely painted prior to the installation of either the windshield or the backlite. Since the painting operation generally includes several spraying and sanding steps, the installation of the fixed vehicle windows is best done after the body is painted.

After the body is painted, a continuous flat thin strip or member 38 is adhesively secured to the body wall 26 entirely around the windshield opening. This strip 38 is of generally rectangular cross section and is of sufficient width to generally cover the wall 26. The strip 38 is supplied in a roll and the outer side or surface 40 of the strip is covered with a paper tape, not shown, before the strip is rolled to aid in unrolling the strip and also mounting it on wall 26, as will be described. A length of strip 38 is cut from the roll sufficient to extend around the windshield opening on the wall 26 and then the uncovered or base side of the strip is manually pressed against the wall 26, with the paper tape remaining in place on the outer side to provide a nonsticking surface for the operator to press against. The free ends of the strip are butted together so that the strip is continuous throughout the window opening after being applied to the body. Thereafter, a roller or other suitable tool is used to further press the strip 38 against the body wall and ensure that there are no voids between the lower surface or base side of the strip and the wall 26 and also ensure that the ends of the strip are adhesively secured together. This ensures that there will be no leaking of water to the interior of the body after the windshield 14 is installed.

The strip 38 preferably is formed of a butyl rubber which is deformable but self-sustaining as to form and also will adhere to painted metal and to itself. In the specific embodiment shown, the strip is .56 in. wide, .150 in. thick, and has a durometer of from 10 to 15. A suitable butyl rubber in strip form is available from Protective Treatments, Inc., of Dayton, Ohio, as compound No. XE-14-42.

After the strip 38 has been manually applied to the body and thereafter pressed against the body wall 26 by the suitable tool, the paper tape covering the outer surface 40 is removed.

A member or strip 42 has its base side or surface 44 adhesively secured to the inner surface of the windshield adjacent the edge thereof. The strip 42 is formed of the same material as the strip 38 since this material will also adhere to glass as well as to painted metal. The strip 42 is narrower and harder than the strip 38 for reasons which will be explained, and is also supplied in a roll with a paper tape covering the side 43 of the strip. After a sufficient length of strip 42 has been cut from the roll, it is manually positioned on the inner surface of the windshield 14 adjacent the edge thereof and manually pressed in place. Thereafter, a suitable roller or other tool is rolled along the side 43 on the paper tape to apply an angular force on the tape and press the inner surface 44 tightly against the inner surface of the windshield and ensure that there are no voids or any unsecured areas which might later cause water leakage problems.

It will be noted that the base portion of the strip 42 is of generally rectangular cross section and that the free outer edge portion 48 thereof is of generally right angular cross section. Although a particular cross section of the free edge portion has been shown, other angular cross sections, such as an isosceles triangular cross section, can be used.

Figure 3:
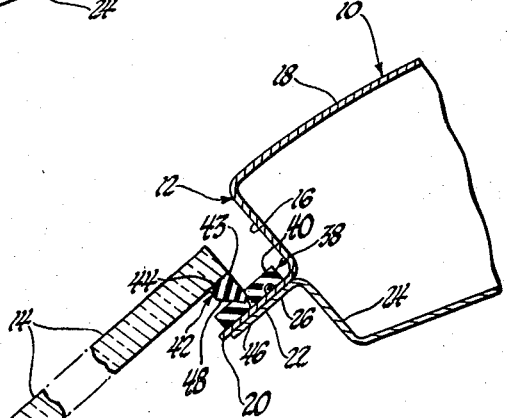
FIGURE 3 is an enlarged sectional view taken generally along the plane indicated by line 3—3 of FIGURE 1.
Figure 3:
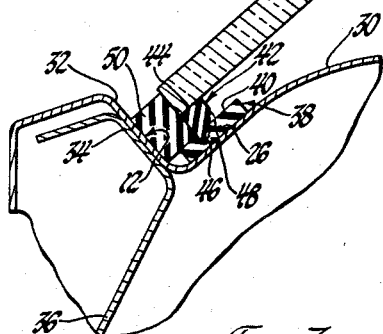

After the strip 42 has been adhesively secured in place, the paper tape is removed from the side 43 and the windshield 14 is manually, or by use of a suitable jig or fixture, located within the confines of the body wall 12 and thereafter moved toward wall 26 or toward the rear of the body to force or press the edge portion 48 of strip 42 within the strip 38 as shown in FIGURE 3 and cause the strips to adhere to each other to mount the windshield 14 on the body. As previously mentioned, the strip 42 is of the same material as the strip 38, although narrower and harder, the durometer of the strip 42 being generally in the range of from 30 to 35. The strip 38 is deformed to a much greater extent than the strip 42 when the edge portion 48 of the strip 42 is pressed within the strip 38. The edge portion 48 does not completely penetrate the strip 38, as shown, but does penetrate a sufficient depth to obtain an adequate seal.

The free edge portion 48 of the strip 42 is of much narrower extent than the strip 38 to ensure that penetration of the strip 38 will occur. This ensures a continuous seal between the strips and takes up production tolerances between the wall 26 and the windshield 14. In the specific embodiment shown, the base side of the strip 42 is .20 in. wide and the outer surface of the edge portion 48 is .03 in. wide. The one common planar wall 43 of the base portion and edge portion 48 of the strip is .24 in. in extent while the other wall of the base portion is .06 in. in extent before it merges into the other tapered wall of the edge portion 48. A suitable material in strip form is available from the aforenoted company under number XE-13-176.

Either before the windshield 14 is located within the confines of the wall 12 or after the strip 42 has been pressed within the strip 38, a plurality, such as two, of spaced rubber block 50, may be located on the wall 12 along the lower edge of the windshield opening. If the blocks are located prior to the installation of the windshield, the lower edge of the windshield may be rested on the blocks and thereafter rotated into place when installed. The blocks can be used for this purpose as well as to support the weight of the windshield 14 if the strips 38 and 42 cannot support such weight.

Suitable conventional clips or studs, not shown, may be provided on the wall 12 to support the exterior reveal moldings 52. These moldings are installed after the windshield 14 has been mounted on the body and the body thereafter water tested to ensure that there are no leaks or voids either between the body and the strip 38, between the windshield and the strip 42, and between the strips.

It can be seen that the windshield mounting of this invention provides a continuous uninterrupted seal between the windshield 14 and the body. Since both strips 38 and 42 are self-sustaining as to form, no dams are required in order to prevent flow of either strip into a sight area on the windshield or body. Additionally, since both of the strips are formed of a material which will adhere to painted metal, glass, and to itself, there is no setup or cure time and the blocks 50 may not be necessary, and if necessary, can be installed after the windshield 14 is installed. Additionally, an effective complete seal is easily obtained between the strips and between the respective strips and the body and windshield to ensure that no water enters the interior of the body.

By having the strip 42 narrower and harder than the strip 38, penetration by deformation of the strip 38 is ensured when the windshield 14 is mounted on the body. This ensures a complete seal entirely around the windshield 14 without any concern over whether there are any voids or adhesively unsecured areas between the strips. Additionally this ensures a complete seal despite production tolerances between the body wall 26 and the windshield 14 such as often occur under mass production techniques.

Although a specific material has been disclosed, other materials can also be used as long as these materials are deformable but self-sustaining as to form and will adhere to painted metal, glass, and to itself.

Although the material disclosed herein does not require any heat or air curing, heat and air curable materials can also be used.

If desired, suitable primers may be used on the wall 26 and also on the inner surface of the windshield 14 to augment the adherence of the respective strips when they are adhesively secured thereto.

From the foregoing description, it is also believed evident that only a minimum amount of tooling is required in order to practice the windshield mounting of this invention and that such tooling would normally consist of rather simple hand tools.

Thus, this invention provides an improved windshield mounting for vehicle bodies.

I claim:

1. In a vehicle body having a closure opening therein, a generally continuous body wall, and a panel of a size to close said opening and have an edge portion thereof juxtaposed to said wall, the combination comprising, a generally flat continuous strip adhesively secured to the body wall, and a second continuous strip adhesively secured to the edge portion of said panel and having a free edge portion narrower than said first strip, the free edge portion of the second strip being pressed within the first strip to adhesively secure the strips to each other and mount the panel on the body, each of said strips being of a self-sustaining deformable rubber-like material which will adhere to the body wall, the panel, and to itself, said first strip being softer than said second strip whereby said second strip will penetrate said first strip by deformation to ensure complete sealing between said strips.

2. The combination recited in claim 1 wherein the free edge portion of the second strip is of angular cross section.

3. The combination recited in claim 1 wherein said first strip is thinner than said second strip and the free edge portion of said second strip extends partially through said first strip after said free edge portion has been pressed within said first strip.

4. The combination recited in claim 1 including a plurality of spaced blocks along the lower edge portion of the closure opening engageable by the lower edge of the panel to aid in supporting the weight of the panel.

References Cited

UNITED STATES PATENTS

| | | | |
|---|---|---|---|
| 3,155,204 | 11/1964 | Campbell et al. | 52—208 |
| 3,155,422 | 11/1964 | Campbell et al. | 296—93 |
| 3,241,277 | 3/1966 | Coppock | 52—208 |

BENJAMIN HERSH, *Primary Examiner.*

L. D. MORRIS, JR., *Assistant Examiner.*

U.S. Cl. X.R.

52—208; 160—354